(12) United States Patent
He et al.

(10) Patent No.: US 10,332,140 B2
(45) Date of Patent: Jun. 25, 2019

(54) LINE MANAGEMENT BASED ON USER TOLERANCE

(71) Applicant: PAYPAL, INC., San Jose, CA (US)

(72) Inventors: Robert He, Pflugerville, TX (US); Bryant Genepang Luk, Round Rock, TX (US); Emil Dides, Coppell, TX (US); Syed Muasir Khalil, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 491 days.

(21) Appl. No.: 14/554,650

(22) Filed: Nov. 26, 2014

(65) Prior Publication Data

US 2016/0148238 A1 May 26, 2016

(51) Int. Cl.
*G06Q 30/02* (2012.01)

(52) U.S. Cl.
CPC ..... *G06Q 30/0207* (2013.01); *G06Q 30/0208* (2013.01); *G06Q 30/0217* (2013.01); *G06Q 30/0224* (2013.01)

(58) Field of Classification Search
CPC .................................. G06Q 30/0207–30/0277
USPC ........... 705/14.1, 14.11, 14.19, 14.25, 14.38, 705/14.18, 14.2
See application file for complete search history.

(56) References Cited

U.S. PATENT DOCUMENTS

| | | | | |
|---|---|---|---|---|
| 7,392,206 B1 * | 6/2008 | Frazier | ............... | G06Q 10/0639 705/14.19 |
| 9,204,257 B1 * | 12/2015 | Mendelson | .............. | G08G 1/14 |
| 2001/0028350 A1 * | 10/2001 | Matsuoka | .......... | G01C 21/3635 345/427 |
| 2002/0013153 A1 * | 1/2002 | Wilcock | ................ | G01S 5/0226 455/456.3 |
| 2003/0010822 A1 * | 1/2003 | Davies | ................. | G06Q 10/047 235/385 |
| 2003/0119530 A1 * | 6/2003 | Rankin | ............. | H04W 52/0241 455/456.1 |
| 2003/0234739 A1 * | 12/2003 | Orler | ....................... | G01S 19/14 342/357.75 |
| 2005/0099291 A1 * | 5/2005 | Landau | .................. | A61H 3/061 340/539.13 |
| 2005/0136845 A1 * | 6/2005 | Masuoka | .............. | G01S 5/0294 455/67.14 |
| 2006/0092016 A1 * | 5/2006 | Modes | ................. | G01C 21/206 340/539.13 |

(Continued)

OTHER PUBLICATIONS

Trademark Electronic Search System (TESS), Bluetooth, Oct. 7, 2016, United States Patent and Trademark Office.*

(Continued)

*Primary Examiner* — Kiersten V Summers
(74) *Attorney, Agent, or Firm* — Haynes and Boone, LLP (57) ABSTRACT

A system or method is provided to detect the positions of various users in line and determine the users' tolerance for waiting in line. Based on the tolerance of the users for waiting in line, the system may rearrange the line positions of the users accordingly. The user's tolerance may be detected by their current position, their current movements and activities, the user's purchase or transaction history, interests and hobbies, past line waiting experience, and the like. In an embodiment, the system may determine incentives or rewards and may offer them to the users who are waiting in line to incentivize them to stay in line.

20 Claims, 6 Drawing Sheets

(56) References Cited

U.S. PATENT DOCUMENTS

| | | | | |
|---|---|---|---|---|
| 2006/0194589 A1* | 8/2006 | Sankisa | | H04W 76/14 455/456.1 |
| 2007/0001904 A1* | 1/2007 | Mendelson | | G01C 21/206 342/450 |
| 2007/0174770 A1* | 7/2007 | Safoutin | | G06F 17/3087 715/700 |
| 2011/0028160 A1* | 2/2011 | Roeding | | G06Q 30/00 455/456.1 |
| 2011/0072132 A1* | 3/2011 | Shafer | | G06Q 10/087 709/224 |
| 2012/0066013 A1* | 3/2012 | Natsuyama | | G06Q 30/02 705/5 |
| 2012/0088519 A1* | 4/2012 | Agardh | | G01S 5/0054 455/456.1 |
| 2013/0028245 A1* | 1/2013 | Oerton | | H04W 4/00 370/338 |
| 2013/0103486 A1* | 4/2013 | Hess | | G06Q 30/02 705/14.38 |
| 2013/0254401 A1* | 9/2013 | Marshall | | G06F 21/6218 709/226 |
| 2013/0254966 A1* | 10/2013 | Pattison | | A41D 13/1245 2/69 |
| 2013/0260788 A1* | 10/2013 | Bonde | | G07C 1/10 455/456.1 |
| 2014/0147018 A1* | 5/2014 | Argue | | G06Q 30/0201 382/115 |
| 2014/0148196 A1* | 5/2014 | Bassan-Eskanazi | | G01S 11/02 455/456.1 |
| 2014/0214500 A1* | 7/2014 | Hudson | | G06Q 30/0284 705/13 |
| 2014/0235265 A1* | 8/2014 | Slupik | | H04W 4/02 455/456.1 |
| 2014/0253383 A1* | 9/2014 | Rowitch | | G01S 1/02 342/386 |
| 2014/0274110 A1* | 9/2014 | Mehta | | H04W 4/043 455/456.1 |
| 2015/0079942 A1* | 3/2015 | Kostka | | H04W 4/21 455/411 |
| 2015/0110259 A1* | 4/2015 | Kaye | | H04W 4/80 379/202.01 |
| 2015/0154674 A1* | 6/2015 | Todasco | | H04W 4/70 705/26.41 |
| 2015/0186957 A1* | 7/2015 | Barr | | G06Q 30/0281 705/346 |
| 2015/0242899 A1* | 8/2015 | Farhi | | G06Q 30/0261 705/14.58 |
| 2015/0289088 A1* | 10/2015 | Terrazas | | H04W 4/029 455/404.2 |

OTHER PUBLICATIONS

Trademark Electronic Search System (TESS), Bluetooth, Jul. 25, 2018, United States Patent and Trademark office (Year: 2018).*

* cited by examiner

LINE MANAGEMENT BASED ON USER TOLERANCE

BACKGROUND

Field of the Invention

The present invention generally relates to line management, and in particular, to systems and methods for implementing line management based on user tolerance.

Related Art

Public venues such as airports, amusement parks, merchant stores and the like, sometimes require customers to wait in line to purchase products, receive services, or access certain facilities. Merchants or operators of public venues may estimate and provide wait time information to customers, such that customers may know how long the wait time is for a line or a queue. However, customers typically dislike having to wait in line and may give up waiting in line to forego the purchases they want to make, especially when the line is long. This may result in sales loss to the merchants and an unpleasant experience for consumers. Thus, there is a need for a system or method that provides an improved experience for both merchants and consumers during line waiting situations.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or method is provided to detect the positions of various users in line and determine the users' tolerance for waiting in line. Based on the tolerance of the users for waiting in line, the system may rearrange the line positions of the users accordingly. For example, users who have lower tolerance for waiting in line may be moved up to the front of the line while users who do not mind waiting may be moved back in line in exchange for an incentive provided to users asked to move back in the line. In an embodiment, the user's tolerance may be detected by their current position, their current movements and activities, the user's purchase or transaction history, interests and hobbies, past line waiting experience, and the like.

In an embodiment, the system may determine incentives or rewards and may offer them to the users who are waiting in line to incentivize them to stay in line. For example, users may collect points that are redeemable for rewards for each minute they wait in line. In another example, the users may be offered incentives to move back in line and allow other users to move up in line. In still another example, the users may be offered amenities, such as wireless internet access or free drinks based on how long they have waited in line, where the amenities may be determined by individual user preferences.

In an embodiment, the system may provide options for users to temporarily leave the line, such as to go shopping or to use the restroom, in exchange for bumping their line positions back in line. In particular, how many spots a user's line position is moved back may be determined based on how long the user has to be gone from the line. For example, if a user chooses to leave the line to go shopping for 30 minutes, the user may be moved back 30 spots. If the user chooses to leave the line to use the restroom for 5 minutes, the user may be moved back 5 spots. Thus, the user may have options to leave a line without having to start from the end of the line.

In an embodiment, the system may detect the user's current activities and locations to determine the user's tolerance for line waiting. In particular, the system may register the user into the line when the user arrives. The system may detect and monitor the user's movement and location, biometrics information, and the like and may determine whether the user is in the middle of certain activities or whether the user is anxious to move up in line. For example, the system may detect that the user is enjoying a drink in a nearby bar and may not mind being "in line" longer. Thus, the system may keep the user in the user's current line position or move the user's line position back to allow other more anxious users to move up in line. If the system detects that the user is waiting and pacing near the entrance or at the front of the line, the system may move the user up in line to shorten the user's wait time.

In an embodiment, the system may collect and analyze the user's line waiting history and may manage the user's current line waiting according to the user's line waiting history. For example, based on the user's line waiting history, the system may determine that the user has visited the same merchant frequently and waited frequently in the merchant's line. The system may reward the user by moving the user up in the current line at the merchant based on the user's line waiting history.

Based on the user's line waiting history and/or the user's purchase or transaction history with the merchant or other merchants, the system also may analyze and determine the user's interest or preference for certain merchants, products, or services. For example, the user may have waited long at a merchant's store, which indicates that the user has strong preference for the merchant or the products or services offered by the merchant. Based on the detected interests or preferences of the user, the system may provide customized incentives or offers to the user. Further, the detected interests or preferences may allow the system to better incentivize the user to stay in line or stay interested while waiting in line.

In an embodiment, the line is a physical line and the positions of the user may be detected by wireless signals, such as Global Positioning System or Bluetooth Low Energy signals from BLE beacons. For example, a line position of a user may be estimated based on the strength of the BLE signal between the user's device and BLE beacons installed at one or more different locations in the line. In another embodiment, a grid of multiple BLE beacons may be installed or provided at the location of the line to track the location and movement of a user. Based on the BLE signals detected at the user's mobile device, the location of the user in the line may be determined by triangulation and by referencing the designated positions of the BLE beacons that emit the BLE signals. In another embodiment, the line is a virtual line, such as a waiting list online or on a telephone call. As such, the positions of the users are determined based on when the phone calls are received or when the users visit or sign in at a website. Each user may be assigned a position number in the line when they call or when they sign up. Thus, users who are in a hurry or want to be in a front part of a line now have the ability to move up, such as by switching places with someone or by incentivizing one or more people in front of the user to vacate their position in line. Users who are not in a hurry or necessarily need to be in a front of a line now have the ability to receive incentives, such as money, to move out or to a back of a line.

Figure 1:
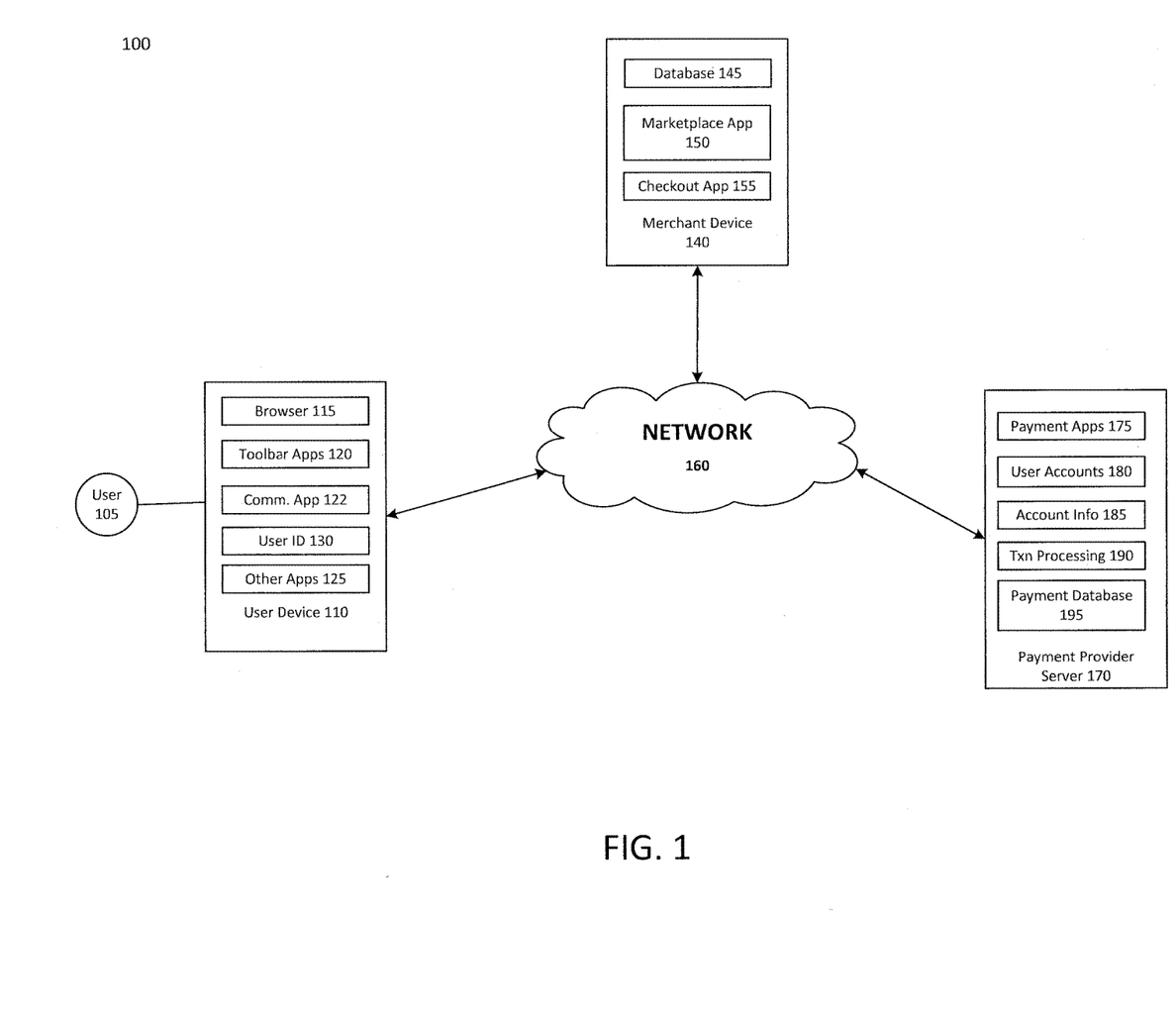
FIG. 1 is a block diagram of a networked system suitable for line management according to an embodiment.

FIG. 1 is a block diagram of a networked system 100 suitable for implementing line management according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to review line status or to accept incentives for waiting in line. Although only one merchant server is shown, a plurality of merchant servers may be utilized if the user is purchasing products or services from multiple merchants.

In some embodiments, user device 110 may download an application from payment provider server 170 or from merchant server 140. The application may provide a line management application that allows user 105 to review line waiting status or to accept incentives for waiting in line or moving back in line. User device 110 may include a Bluetooth device configured to implement low energy Bluetooth communication. A network of low energy Bluetooth beacons may be installed at various line locations at various merchants or public venues. Thus, the location and movements of user device 110 at various line locations may be detected by the various Bluetooth beacons. The location and movement of user 105 and/or other users may be used to determine the respective line positions of the users in line.

User device 110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, wearable device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise communicate and receive information for line management as discussed herein. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include a Bluetooth device configured to implement low energy Bluetooth (BLE) communication. For example, user device 110 may detect various low energy Bluetooth signals from Bluetooth beacons installed in a merchant's store or at various public venues. Thus, locations and movements of user device 110 may be determined by positioning techniques, such as triangulation or location fingerprinting. User device 110 also may include other location sensors, such as Global Positioning System (GPS), or movement sensors, such as gyroscope and/or accelerometer, that are configured to detect location and movement.

Merchant server 140 may be maintained, for example, by a merchant or seller offering various products and/or services or by an operator of a public venue. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers, or provides services and/or items to a user.

Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Merchant server 140 may be connected to a network of Bluetooth beacons installed in the merchant's brick-and-mortar store or at the operator's public venue. The network of Bluetooth beacons may be installed at or near the line locations of the merchant's store or public venue to form a grid. Each Bluetooth beacon may emit a low energy Bluetooth signal in a specific frequency spectrum periodically. Thus, the network of Bluetooth may allow detection of locations and movements of the consumer at different line locations. In some embodiment, the BLE beacons may be positioned throughout amenities, locations, merchants, venues that are near line locations. Thus, the movement and locations of users at and near the line locations also may be detected and monitored.

Payment provider server 170 may be maintained, for example, by an online payment service provider which may provide services between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments from or receive payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

In some embodiments, payment provider server 170 may maintain a database including information regarding the line locations at respective merchant stores or public venues. The information regarding the line locations may be include floor layout of the merchant store or public venue, location of the line, shape, size, and/or orientation of the line, service or facility access associated with the line, BLE beacons associated with the line, historical wait times of different lines in different venues at different times of the day or year, and the like. Payment provider server 170 may periodically update the information regarding the line location. In an embodiment, the payment provider server 170 may maintain a line management database storing line waiting history and/or current line waiting status of various users at various line locations. As such, the payment provider server 170 may facilitate line management for different users at different line locations.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment and/or implementing line management as described herein. As such, transaction processing application 190 may store details of an order from individual users, including funding source used, credit options available, etc., as well as line positions, wait times, and lengths. Payment application 175 may be further configured to determine the existence of and to manage accounts for user 105, as well as create new accounts if necessary.

Figure 2:
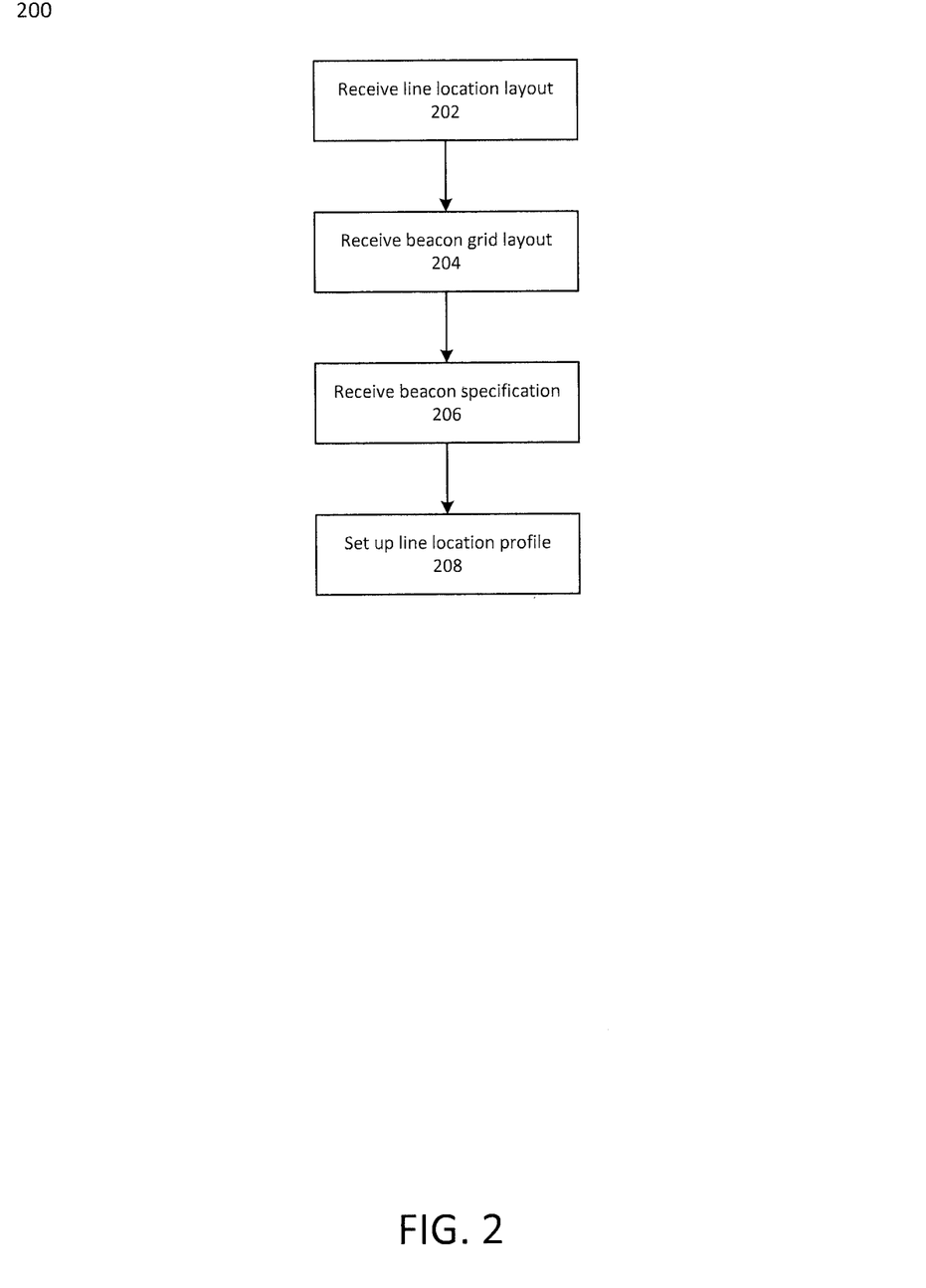
FIG. 2 is a flowchart showing a process for setting up line management according to one embodiment.

FIG. 2 is a flowchart showing a process 200 for setting up line management according to one embodiment. At step 202, user device 110 or payment provider server 170 may receive or access line location layouts of various merchants' stores and/or public venues. For example, floor layouts for grocery stores, retail stores, restaurants, museums, airports, amusements parks, stadiums, arenas, or other public venues visited by consumers may be received by user device 110 or payment provider server 170. Each layout may include a profile indicating the name of the merchant or operator of the public venue, the address, contact information, type of business, products or services offered, and other information related to the location. Payment provider server 170 may store the various layouts of line locations in a database each with its own profile. The layouts may indicate line locations where lines may be formed by consumers or users to gain access to certain amenities or to receive service.

At step 204, user device 110 or payment provider server 170 may receive or access layouts of networks of beacons corresponding to the store layouts received in step 202. The beacon layouts may be merged with their corresponding line location layouts, such that the coordinates of each beacon in the beacon grid may be designated. For example, a network of Bluetooth beacons may be installed in a merchant's store.

Each Bluetooth beacon may be installed at a specific location in the merchant's store and may emit low energy Bluetooth signals. Thus, a network or grid of Bluetooth beacons may be formed in the merchant's store.

Figure 5:
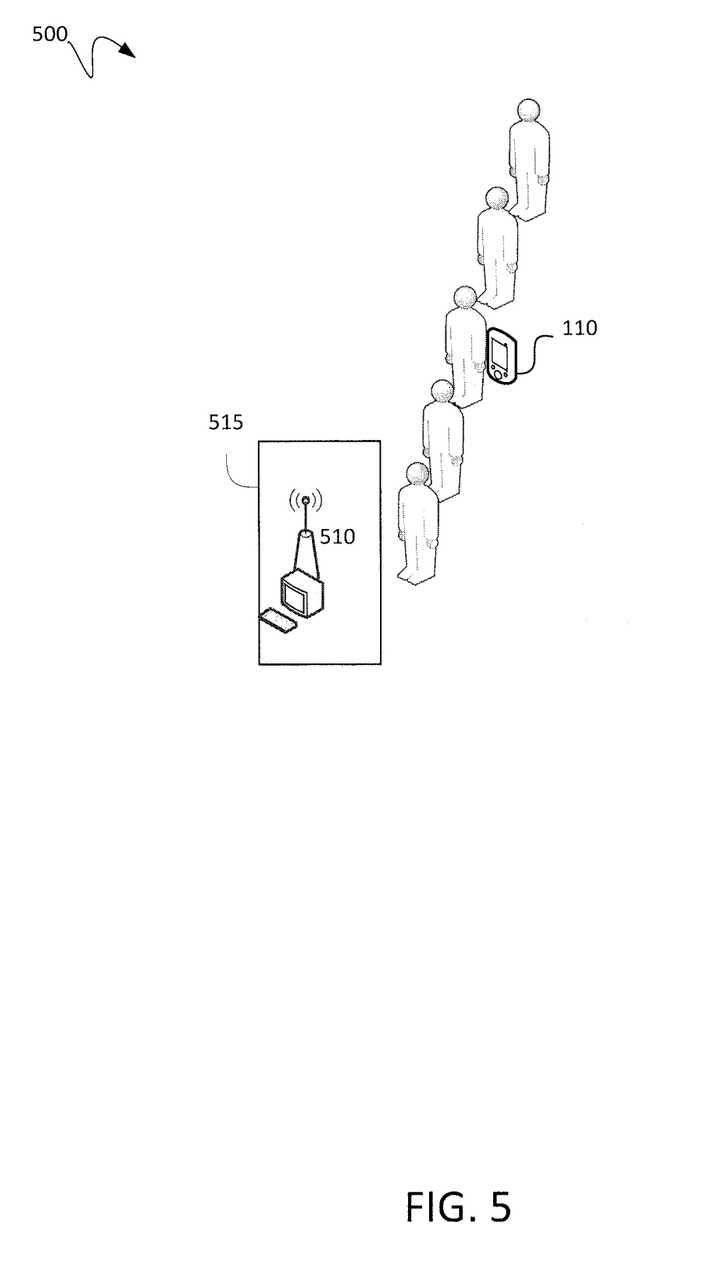
FIG. 5 is a diagram depicting customers waiting in line according to one embodiment.

As shown in FIG. 5, as an example, a system 500 that includes a Bluetooth beacon 510 may be installed at checkout counter 515. The Bluetooth beacon 510 may be connected to a merchant device 140. The Bluetooth beacon 510 may emit a low energy Bluetooth signal with a specific frequency spectrum. User 105 may carry a user device 110 including a Bluetooth device configured to communicate via low energy Bluetooth communication. When user 105 enters the line location, user device 110 may detect Bluetooth beacons 510 installed at the checkout counter 515. Thus, the user 105 may be detected when the user 105 is standing in line via Bluetooth communication.

Returning back to FIG. 2, at step 206, user device 110 or payment provider server 170 may receive Bluetooth beacon specifications of various BLE beacons installed at respective line locations. Each Bluetooth beacon at the line location may emit a unique signal. A Bluetooth beacon database may be used to store profiles for each Bluetooth beacon. For example, each Bluetooth beacon may have a profile containing the Bluetooth beacon's line location, the unique signal signature of the beacon, the signal strength of the beacon, the broadcast range of the beacon, and the like. In some embodiments, a plurality of BLE beacons may be associated with a line location to provide better detection of the location and movement of users standing in line at the line location.

For a physical line, the position of the user 105 may be determined based on the Bluetooth signals received at user device 110 using techniques, such as triangulation or location fingerprinting. In the triangulation technique, the location of user device 110 may be determined based on the locations of three Bluetooth beacons 510 and the distance of user device 110 from the three Bluetooth beacons 510. The locations of the Bluetooth beacons 510 may be predetermined when the Bluetooth beacons 510 are installed at the line location. The distance between the Bluetooth beacons 510 and user device 110 may be determined based on the signal strength received between the Bluetooth beacons 510 and user device 110. A stronger signal may indicate a shorter distance while a weaker signal may indicate a longer distance. Thus, based on the Bluetooth signals between the Bluetooth beacons 510 and user device 110, the location of user device 110 may be determined using the triangulation technique.

Figure 6:
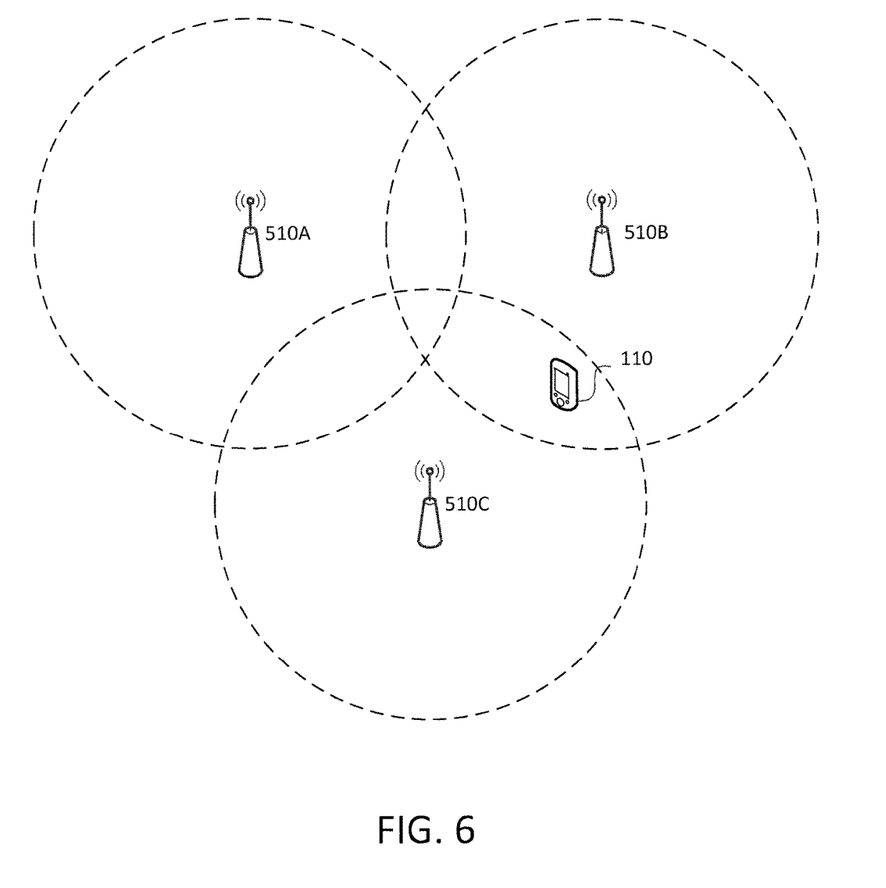
FIG. 6 is a diagram depicting a network of beacons according to one embodiment.

For example, as shown in FIG. 6, three Bluetooth beacons 510A, 510B, and 510C may each emit a unique Bluetooth signal. The signal range of each beacon may be illustrated as a circle of dashed line surrounding each beacon. As shown in FIG. 6, user device 110 may be located at a position at which user device 110 receives signals from beacon 510B and beacon 510C, but not beacon 510A. In particular, user device 110 receives signals with about the same signal strength from both beacons 510B and 510C. Thus, user device 110 is located between an area between beacons 510B and 510C, but away from 510A. Further, based on the signal strengths of the signals, the distance between user device 110 and beacons 510B and 510C may be determined. User device 110 or payment provider server 170 may analyze the signals and their signal strengths received at user device 110 and reference the locations of the beacons that emit these signals to determine the location of user device 110 by triangulation techniques.

In the location fingerprinting technique, a database of signal fingerprints at various locations within the public venue may be predetermined. For example, a signal profile may be predetermined for each location. The signal profile may include Bluetooth signals that are detected at that location and the strength of each of those detected Bluetooth signals. For example, as shown in FIG. 6, when user device 110 is positioned at a certain position between beacons 510B and 510C, a signal profile may be predetermined to indicate medium signals from beacons 510B and 510C and low or no signal from beacon 510A. A database of signal profiles associated with a plurality of respective locations on the shopping floor may be predetermined and stored. Thus, based on a signal profile detected by user device 110, a location of user device 110 may be determined by referencing the database of signal profiles.

In some embodiments, the signal profile may be the Bluetooth signal of user device 110 received by respective Bluetooth beacons. For example, as shown in FIG. 6, when user device 110 is positioned between beacons 510B and 510C, a signal profile may be predetermined to indicate medium signals received by beacons 510B and 510C, and weak or no signal received at beacon 510A. Thus, the signal fingerprints may be signals received by user device 110 or signals received by the respective Bluetooth beacons 510.

The location of user device 110 may be determined by user device 110. For example, user device 110 may download a layout map of the merchant or the public venue and may determine user device 110's position based on the Bluetooth signals detected and the floor layout of the Bluetooth beacons 510. In some embodiments, merchant device 140 may determine the location of user device 110 based on which Bluetooth beacons 510 detect user device 110 and the strength of the signal detected at the Bluetooth beacons 510. In some embodiments, the detected signals and signal strengths may be forwarded to payment provider server 170 and payment provider server 170 may determine the location of user device 110.

For a virtual line, the line position of the user 105 may be determined based on the order of users entering the line. For example, a position number may be assigned to the user 105 when the user 105 enters the ling by calling or by visiting a website. An estimated wait time and the line position of the user 105 may be presented to the user 105. For example, a notification: "Thank you for calling, you are customer number 14 and the estimated wait time is 18 minutes." The line position and the estimated wait time may be updated and notified to the user 105 periodically to keep the user 105 informed of the progress of the line. Other ways of determining a user's position in line may also be used, such as a user entering a line position or number into a user device and the user device communicating that information to the service provider.

At step 208, the system may set up a line location profile for the line location. The line location profile may provide information about a line, such as the merchant or revenue's identity, type, hours of operation, address, owner or operator, nearby merchants, amenities, and the like. The line location profile also may include information related to the line's current status, estimated wait time, number of people in line, number of customer turn over (customers who left before reaching the front of the line), tolerance of users waiting in line, available activities while waiting in line, and the like.

Accordingly, process 200 may be used to set up line management for line locations at various merchant stores or public venues. For example, the line location, floor layout, number, specification, and locations of BLE beacons installed at the line location, and other related information may be collected and used to detect line positions of users and set up line management interface for the line locations. Thus, based on the BLE communication set up at the line location, the system may detect the presence, location, and/or movement of users standing in line and may set up the line management interface.

Figure 3:
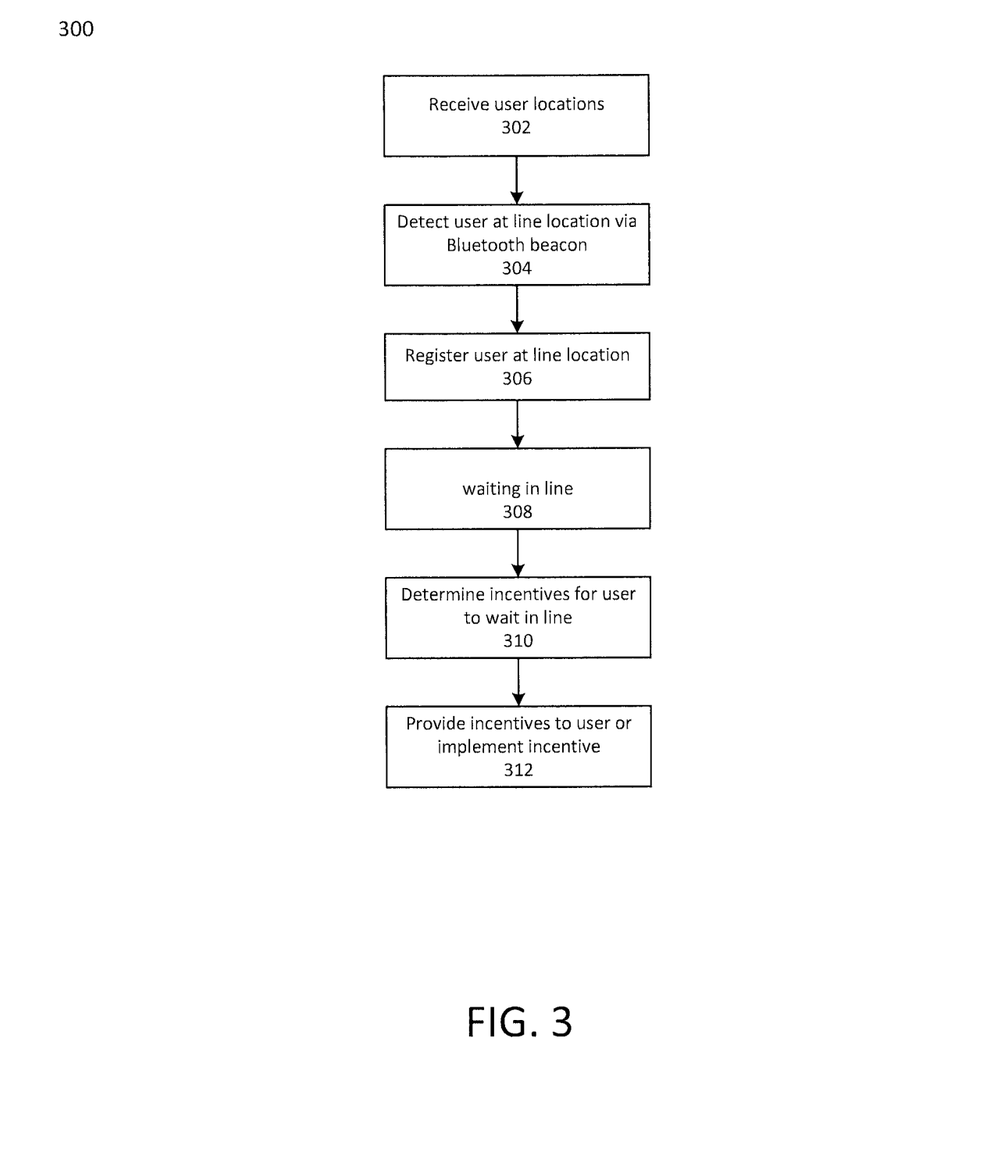
FIG. 3 is a flowchart showing a process for implementing line management according to one embodiment.

FIG. 3 is a flowchart showing a process 300 for implementing line management according to one embodiment. At step 302, merchant device 140 or payment provider server 170 may receive user 105's location. For example, as noted above, the location and/or movement of the user 105 may be detected by one or more BLE beacons installed at a store or public venue. In another embodiment, the location of the user 105 may be detected by GPS device or movement sensors included with user device 110. In yet another embodiment, the location of the user 105 may be reported by the user through the user device.

At step 304, the presence of a user 105 at a line location may be detected by one or more BLE beacons. One or more BLE beacons may be installed at a line location of a store or a public venue. The presence of the user 105 may be detected by the BLE beacons when the user device 110 receives and responds to the BLE beacons' Bluetooth signals. For example, a grid of BLE beacons may be positioned along different positions of an anticipated line, such as from the front of a checkout terminal to the farthest distance the merchant expects a line to extend, in whatever shape the line is expected to take. The BLE beacon may broadcast a Bluetooth signal in an extending direction of the line. When the user 105 enters at the end of the line, the Bluetooth signal from the BLE beacon may be received by use device 110 which may respond with a Bluetooth signal back to the BLE beacon. Thus, the system may detect that the user 105 has entered or is at the line location at a particular location of the merchant store. In other embodiments, line location of a user may be obtained through other means, such as self-reporting or reporting by others (such as others in line or a person counting positions of particular people in line). For example, the user 105 may sign in or register at the line when the user 105 arrives at the line location.

In an embodiment, a plurality of BLE beacons may be installed at the line location to provide more accurate detection of the location and movement of the users at or near the line location. The plurality of BLE beacons may allow the system to detect the user 105's location and movement within the line location. For example, the BLE beacons may detect the presence of the user 105 and where the user 105 enters the line, the movement and speed of the user 105 in line, when and/or where the user 105 reaches the front of the line, and when and/or where the user 105 departs from the line location. The BLE beacons may also detect rates of movement within various locations in the line. The BLE beacons also may detect the user's movement and position at nearby locations, such as nearby stores, amenities, or other point of interest, such as sports bars, restaurants, restrooms, arcades, and the like, where users may be interested to spend time while waiting in line.

At step 306, the system may register the user 105 at the line location. In an embodiment, the system may send a query to the user 105 at the user device 110 to ask the user 105 whether the user 105 is getting in line at the line location. For example, the query may state: "Are you getting in a queue at store A?" If the user 105 responds affirmatively, the system may then register the user 105 at the line location of store A.

The system may then determine the line position of the user 105 at the line location. Based on the user 105's line location, the system may assign a line position number to the user 105 and may estimate the wait time for the user 105's line position. In an embodiment, the system may send a notification or a message to the user device 110 notifying the user 105 of his or her current line position and the estimated wait time for that line position. In some embodiments, the system may provide the user 105 with status or progress information of the line, such as the length of the line (how many people), number of people in front of the user 105, number of people behind the user 105, availability of space, seats, products, or services at the merchant or venue, estimated availability of space, products or service based on the user 105's line position, estimated value of the user 105's line position based on historical data and current status of the line, and the like. As such, the user 105 may be informed of the user 105's position in line and the availability of space, product, or service at the merchant or at the public venue. A graphical representation of the line may be formulated and presented to the user 105. The graphical representation may depict a line of nodes representing positions in the line. One of the nodes may have a different color from other nodes representing the line position of the user 105 in the line.

At step 308, the system may determine the user 105's tolerance for waiting in line. The system may detect the user 105's movement and location by GPS and/or BLE devices included with the user device 110. Based on the user 105's movement and location, the system may infer or determine what activity the user 105 is current involved. For example, the user 105 may be moving between nearby stores or stores in the same shopping area as the line location. Thus, the system may determine or infer that the user 105 is browsing or shopping at nearby merchants. In another example, the user 105 and the user 105's friends may be detected at a nearby restaurant or sports bar. Thus, the system may determine or infer that the user 105 is dining at the restaurant or hanging out at the sports bar with friends while they are waiting in line. In still another example, the system may detect that the user 105 is standing in line or near the line with minimum movement or is pacing back and forth. Thus, the system may determine that the user 105 is anxiously waiting in line.

In an embodiment, the system may detect the user 105's biometric information, such as the user 105's heart rate, temperature, voice, operation of the user device 110, and the like. Thus, the system may infer or determine the user 105's emotional or mental state based on the biometric information of the user 105 or the user 105's operation of the user device 110. For example, the user device 110 may include various biometric sensors, such as temperature sensor, heart beat sensor, and the like that may measure the user 105's biometric information. The user 105's operation of the user device 110, such as browsing on the internet, apps being used, telephone calls made, and the like also may be used to gauge the user 105's mental state or emotional state. The detected mental or emotional state may be used as factors for determining the user 105's tolerance for waiting in line.

In an embodiment, the system may access the user 105's calendar, contact list, to-do list, social networking account, schedule, and the like, with the user 105's permission to analyze information related to the user 105's tolerance for waiting in line. For example, based on the user 105's calendar or schedule, the system may determine whether the user 105 has a pending or upcoming event or appointment. If the pending or upcoming event or appointment is approaching and may interfere with the user 105's line waiting, the system may infer or determine that the user 105 has a low tolerance for waiting in line. In another example, based on the user 105's social networking account or online postings, the system may determine or infer that the user 105 has strong interest or preference for the merchant, product, or service offered at the line. Thus, the user 105 may have higher tolerance for waiting in line.

In an embodiment, the system may access and analyze the user 105's line waiting history, transaction history, and/or purchase history to determine the user 105's tolerance for waiting in line. In particular, based on the user 105's line waiting history, transaction history, and/or purchase history, the system may infer or determine the user 105's interest or preference for the merchant, product, or service offered at the line location, which may then be used to determine the user 105's tolerance for a line. For example, based on the user 105's line history, the user 105 had waited 3 hours for a product offered at the line. Thus, the system may determine that the user 105 has strong interest for the product offered at the line. If user 105 had tried and given up waiting at a line for a certain service, the system may determine that the user 105 has low tolerance for waiting in line for that certain service. In another example, the price the user 105 paid for certain products or services or the frequency the user 105 purchased certain products or services also may be used to determine the user 105's tolerance for waiting in line for the certain products or services.

In an embodiment, the system may consider and apply the user 105's preference and/or interest for certain products or services that are similar to the products or services offered at the line. For example, the user 105 may have strong interest or preference for shoes. As such, the same interest or preference may be applied to similar products, such as clothing or wearable accessories that the user 105 is waiting in line for. Thus, similar interest or preference levels may be applied to similar products or services for estimating the user 105's tolerance for waiting in line.

In an embodiment, the system may analyze all of the above factors and may calculate a tolerance score for the user 105's tolerance for waiting in the particular line. In particular, various factors, such as line waiting history, purchase history, transaction history, user 105's calendar, schedule, to-do list, social networking account, online posting, user 105's current activities, and the like, may be weighted and assigned points. The points may be aggregated to result in the user 105's overall tolerance score. A higher tolerance score may indicate that the user 105 has higher tolerance for waiting in line while a lower tolerance score may indicate that the user 105 has lower tolerance in waiting in line.

At step 310, the system may determine incentives for the user 105 who is waiting in line. In an embodiment, the incentives may include rewards, coupons, or the like that may encourage or incentivize the user 105 to stay in line. In an embodiment, the user 105 may earn or accumulate reward points for the time the user 105 waits in line. For example, the system may monitor or calculate how many minutes the user 105 has waited in line and may reward the user 105 with one reward point for each minute the user 105 waited in line. The reward points may be accumulated by the user 105 to redeem products, services, discounts, coupons, and the like, from the merchant. In an embodiment, the reward points may be accumulated to elevate the user 105's status, such as to a VIP status, that enjoys special treatment by the merchant. In another embodiment, the reward points may be used to skip the line or shorten the line waiting for future shopping trips.

In an embodiment, the user 105 may be offered certain products, services, discounts, or the like for waiting for a certain amount of time in line. For example, the system may offer the user 105 a 10% discount for the current purchase for the user 105 to wait 10 minutes in line. In another example, the system may offer the user 105 a percentage discount for each minute the user 105 waited in line. Thus, the user 105 may have incentive to continue waiting in line to earn more rewards or discounts.

In an embodiment, the system may offer more valuable incentives to users who have lower tolerance for waiting in line. In particular, based on each user's tolerance score, the system may offer proper value of incentives to better incentivize the user to stay in line. In an embodiment, the incentives may be determined based on the user 105's preferences or interest. In particular, the user 105's interest or preference may determine the type of incentive offered to the user 105 to incentivize the user 105 to stay in line. For example, the user 105 may have strong interest in spa services. Thus, the system may provide incentives, such as coupons, discounts, or the like, that are related to spa services to incentivize the user 105 to stay in line.

In an embodiment, the system may determine incentives based on the user 105's current position or activities or current or past purchases or interests. For example, the system may detect that the user 105 is currently shopping at a nearby merchant's store while the user 105 is waiting in line. Thus, the system may generate a coupon or discount that is applicable to the nearby merchant, such that the user 105 may utilize the coupon or discount while shopping at the nearby merchant. In another example, the system may detect that the user 105 is currently dining or hanging out at a nearby sports bar while the user 105 is waiting in line. Thus, the system may generate a coupon or discount for a free drink that can be used at the nearby sports bar. Thus, the user 105 may be able to redeem the coupon or discount at the sports bar while the user 105 is waiting in line. If the user is waiting in a physical line, one user may be offered an incentive of a free soda, while another similarly situated user may be offered an incentive of $5 off on a purchase, and yet another user may be offered an incentive of 20% off a next purchase. Thus, incentives may vary depending on the individual user and what is considered more valuable to that user.

In an embodiment, the system may offer incentives to the user 105 in exchange for moving back in the line. In particular, if the user 105 has a high tolerance for waiting in line or does not mind waiting in line due to the user 105's current activity, the system may offer the user 105 incentives in exchange for moving the user 105 back in line. For example, the user 105 may be having good time at a nearby restaurant with the user 105's friends and may not mind waiting 20 minutes longer, the system may offer the user 105 with a free desert coupon applicable at the nearby restaurant in exchange for moving the user 105's line position back by 10 spots, which estimated to be 20 minutes longer wait. In another example, the user 105 may be determined as someone who does not mind waiting in line (generally or for this particular situation), such as having a history of waiting longer periods in line, having ample free time during the line waiting (such as shown by the user's calendar), being able to receive the item/service even farther back in line, having a history of accepting offers to move back in lines, etc. Thus, other users who have lower tolerance for waiting in line may be moved forward in line.

At step 312, the system may provide incentives to the user 105 or implement the incentives to encourage the user 105 to stay in line. One or more incentives as described above may be presented to the user 105 at the user device 110. The user 105 may choose to accept one of the offers or incentives. In an embodiment, the system may continuously update and track the user 105's progress for earning certain rewards. For example, the system may present the amount of time the user 105 has been waiting in line and the amount of reward points or the discounts or rewards the user 105 is qualified for.

If the user 105 is accepting an incentive in exchange for changing the user 105's line position, the system may present the user 105's line position and estimated wait time before and after the change in line position. Other users waiting in line also may be notified of the change in line position. For example, for users who have low tolerance for waiting in line, the system may notify them that their wait time has been reduced. This may encourage them to continue waiting in line. In some embodiment, if the user 105 accepts an incentive, the system may automatically apply the incentive to the user 105's current or future purchase.

In an embodiment, the system may monitor the inventory of products, space, or services available for the line and may allow the users who are waiting in line to pre-order the product, space, or service offered at the line. For example, the system may check the product inventory of the store where the line has formed and may allow the customers standing in line to designate or pre-order the product they are standing in line to purchase. As such, the system may provide an estimate of product availability to each customer who is standing in line. The availability of desired products may be presented in probabilities. For example, when there are 50 available products in the store and there are 10 people in front of the user 105 who are interested in purchasing the product, the probability that the product is available for the user 105 to purchase is relatively high, especially if the products are typically purchased in quantities of one or two (e.g., a television), as opposed to volume purchases, like gift cards, or if the products are limited to a specific number per customer. On the other hand, if there are 45 people in front of user 105 who are interested in purchasing the product, the probability that the product is available for the user 105's purchase is relatively low. The probability may be updated as the line position of the user 105 and other users change. This may allow customers who are waiting in line to have accurate and updated estimation of whether they may be able to get what they are waiting in line for and whether it is worth their time to wait in line. Further, merchants and/or operators of venues may have a good estimate on how much inventory they should prepare for different products or services.

In an embodiment, merchants or operators of the line may offer incentives to the customers based on the merchants' or operators' preference for certain customers. In particular, the merchant or operator of the line may access each customer's purchase history, transaction history, loyalty program, and the like, and may determine each customer's value or loyalty level to the merchant or operator. The merchant may have certain preference profiles for attracting particular types of customers, such as customers with certain age, gender, demographic, music preference, interest, and the like. For example, based on a customer's purchase history, the merchant may determine that the customer is a big spender in apparels. Thus, the merchant may offer more valuable incentives to encourage the customer to stay in line at an apparel store. In another example, the merchant may offer more valuable incentives to other customers in front of a big-spender customer to encourage the other customers to be moved back in line, such that the big-spender customer may move up faster in line. In yet another example, valuable customers may automatically be moved up in line without incentives.

Accordingly, the system may track the line position of users who are standing in line. The system may determine their respective tolerances for standing in line and may offer appropriate incentives to encourage them to stay in line. Further, the system may provide estimated wait time, estimated availability of products or services, and other information such that the user may decide whether to wait in line.

The above processes 200 and 300 may be executed by user device 110. In some embodiments, the processes 200 and 300 may be executed at merchant device 140 or payment provider server 170. In some other embodiments, above processes 200 and 300 may be executed by one or more of user device 110, merchant device 140, and payment provider server 170 in coordination with each other.

Figure 4:
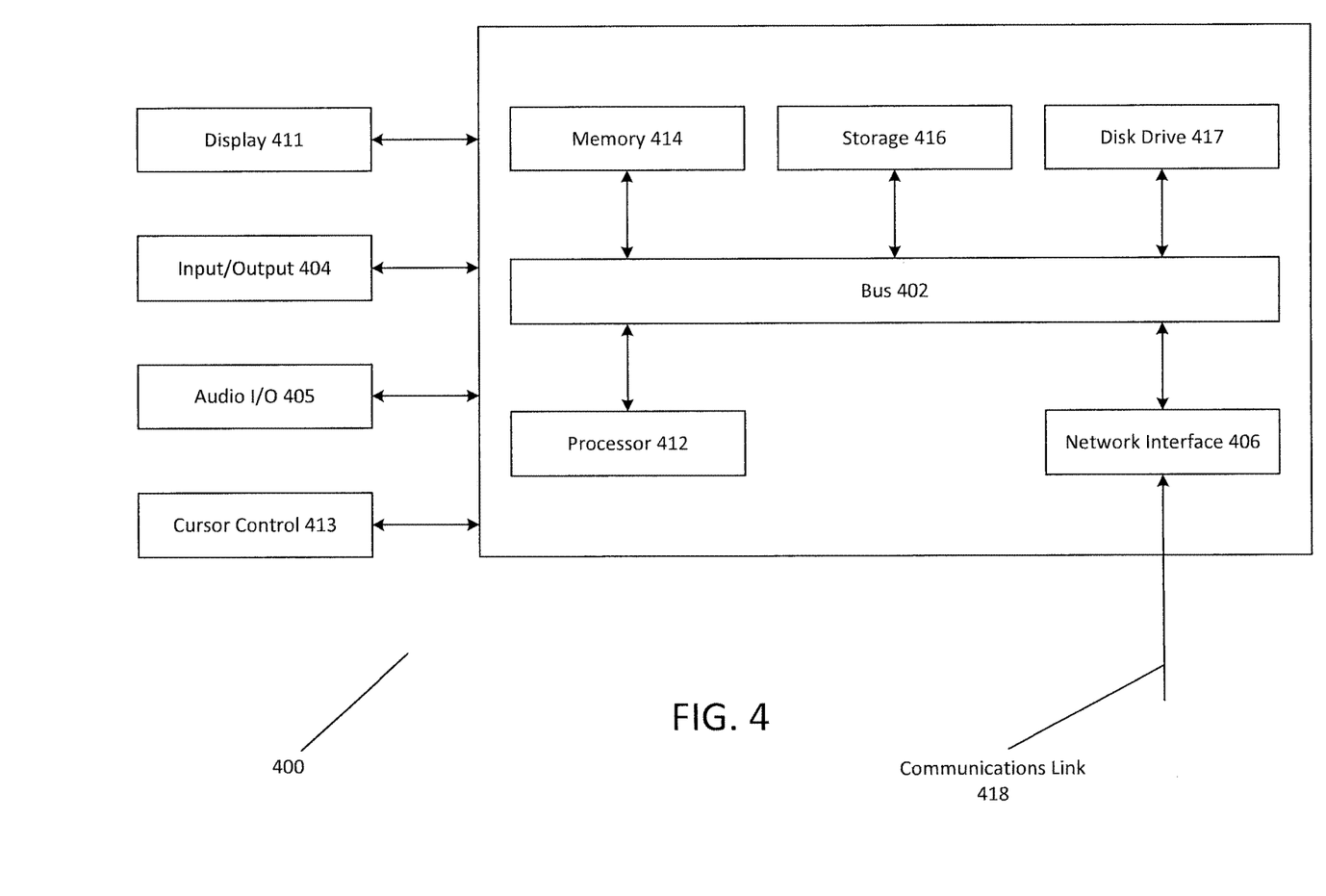
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing a plurality of line location layouts, and account information corresponding to a user account of a user; and
one or more hardware processors in communication with the non-transitory memory, the one or more hardware processors configured to execute computer-executable instructions to cause the system to perform operations comprising:
determining that a user device is located in a first location, wherein the first location includes a beacon array comprising a plurality of wireless beacons;
providing, to the user device, a first line location layout associated with the first location, wherein the plurality of line location layouts comprises the first line location layout;
receiving a line position of a user in a line from the user device of the user, wherein the line position is determined by receiving a beacon layout of the beacon array, determining a location of a first line based on the beacon layout and the first line location layout, triangulating a location of the user device based on unique wireless beacon signals containing wireless beacon location data received from a first plurality of the wireless beacons and a strength of each of the unique wireless beacon signals to determine a distance of the user device relative to locations of the first plurality of wireless beacons;
determining, from the location of the user device and the location of the first line, that the user is in the first line, and determining, from the location of the user device and the location of the first line, the line position of the user;
subsequent to the receiving the line position, automatically calculating a tolerance of the user for waiting in the line by analyzing the account information and user activity information of the user collected by the user device, the user activity information not including an affirmative indication by the user of the tolerance of the user for waiting in the line;
generating an incentive to offer the user based on the tolerance; and
communicating the incentive electronically to the user.

2. The system of claim 1, wherein the first plurality of wireless beacons comprises at least three wireless beacons.

3. The system of claim 1, wherein the operations further comprise:
adjusting the line position of the user in the line based on the tolerance.

4. The system of claim 3, wherein the calculating the tolerance of the user comprises generating a tolerance score for the user and comparing the tolerance score with a threshold.

5. The system of claim 1, wherein the user activity information is selected from a group consisting of user movement information, user location information, user biometric information detected by the user device, and user device operation information.

6. The system of claim 1, wherein the tolerance is further based on the line position of the user and an estimated wait time of the user.

7. The system of claim 1, wherein the incentive is determined based on information selected from a group consisting of an interest level of the user for a product or a service offered at a physical location corresponding to the line, transaction history information of the user, purchase history information of the user, line waiting history information of the user, and merchant preference information for the user.

8. The system of claim 1, wherein the account information is selected from a group consisting of calendar information, to-do list information, schedule information, waiting history information, purchase history information, transaction history information, and social networking account information of the user, and wherein incentive is selected from a group consisting of a coupon corresponding to the user activity information of the user, reward points for a reward program, and a voucher to skip a future line.

9. The system of claim 1, wherein the operations further comprise:
 determining the user activity information of the user based on a current location of the user device, and wherein the generating the incentive is based on the user activity information of the user.

10. The system of claim 1, wherein the operations further comprise:
 receiving, from the user device, device data associated with movement of the user device, wherein the user activity information comprises the device data and the calculating the tolerance of the user for waiting in the line comprises determining, from the device data, that the user is standing or pacing, and wherein the incentive is further based on determining that the user is standing or pacing.

11. The system of claim 1, wherein the generating the incentive comprises determining the tolerance of the user is less than a predetermined tolerance threshold, and the incentive is offered in exchange for the user remaining in the line.

12. The system of claim 1, wherein the incentive is further based on the tolerance of the user being greater than a predetermined tolerance threshold, and the incentive is offered in exchange for adjusting the line position of the user further back in the line.

13. The system of claim 12, wherein the operations further comprise in response to the adjusting the line position of the user further back in the line, communicating, to one or more other user devices corresponding to one or more other users in the line, that the respective wait times of the one or more other users have been reduced.

14. A method comprising:
 determining that a user device associated with a user is at a first location, wherein the first location includes a beacon array comprising a plurality of wireless beacons;
 accessing a first line location layout associated with the first location;
 receiving a beacon layout of the beacon array, wherein each wireless beacon of the beacon array broadcasts a unique wireless beacon signal containing wireless beacon location data;
 determining a location of a first line based on the beacon layout and the first line location layout;
 determining a location of the user device relative to the beacon array, the location of the user device determined by calculating a distance of the user device relative to locations of a first plurality of wireless beacons, the distance determined by triangulation based on unique wireless beacon signals from the first plurality of wireless beacons and signal strengths of each of the unique wireless beacon signals;
 determining a line position of the user based on the location of the user device and the location of the first line;
 subsequent to the determining the line position of the user, automatically determining a user tolerance for waiting in the line by analyzing account information and user activity information collected by the user device, the user activity information not including an affirmative indication by the user of the tolerance for waiting in the line;
 generating an incentive to offer the user based on the user tolerance; and
 electronically communicating the incentive to the user.

15. The method of claim 14 further comprising rearranging the line position of the user based on the user tolerance.

16. The method of claim 15, wherein user tolerances for waiting in line are determined for a plurality of users, and wherein the rearranging comprises:
 moving users with higher user tolerances backward in the line; and
 moving users with lower user tolerances forward in the line.

17. The method of claim 14, further comprising presenting the user with status information of the line, the status information selected from a group consisting of a number of people in the line, a number of tickets sold for a public venue, and a capacity of the public venue.

18. The method of claim 14, further comprising presenting the user with status information of the line, the status information selected from a group consisting of a number of people in the line, an inventory of products desired by the user, and a probability that the products are available for the user.

19. The method of claim 14, wherein the user activity information is selected from a group consisting of user movement information, user location information, user biometric information detected by the user device, and user device operation information.

20. The method of claim 14, wherein the first plurality of wireless beacons comprises at least three wireless beacons.

* * * * *

UNITED STATES PATENT AND TRADEMARK OFFICE
CERTIFICATE OF CORRECTION

PATENT NO. : 10,332,140 B2
APPLICATION NO. : 14/554650
DATED : June 25, 2019
INVENTOR(S) : Robert He et al.

Page 1 of 1

It is certified that error appears in the above-identified patent and that said Letters Patent is hereby corrected as shown below:

In the Specification

In Column 7, Line 6, change "at checkout counter" in -- at a checkout counter --.

In Column 7, Line 8, change "to a merchant" to -- to merchant --.

In the Claims

In Column 17, Line 41, Claim 13 change "that the respective" to -- that respective --.

Signed and Sealed this
Twenty-first Day of April, 2020

Andrei Iancu
*Director of the United States Patent and Trademark Office*